United States Patent
Suzuki et al.

(10) Patent No.: US 10,096,870 B2
(45) Date of Patent: Oct. 9, 2018

(54) NON-AQUEOUS ELECTROLYTE SECONDARY BATTERY

(71) Applicant: Nissan Motor Co., Ltd., Yokohama-Shi, Kanagawa (JP)

(72) Inventors: Yosuke Suzuki, Kanagawa (JP); Kazuyuki Sakamoto, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 15/302,865

(22) PCT Filed: Mar. 27, 2015

(86) PCT No.: PCT/JP2015/059729
§ 371 (c)(1),
(2) Date: Oct. 7, 2016

(87) PCT Pub. No.: WO2015/156155
PCT Pub. Date: Oct. 15, 2015

(65) Prior Publication Data
US 2017/0033418 A1 Feb. 2, 2017

(30) Foreign Application Priority Data
Apr. 11, 2014 (JP) .................. 2014-082257

(51) Int. Cl.
| | |
|---|---|
| *H01M 10/04* | (2006.01) |
| *H01M 10/625* | (2014.01) |
| *H01M 10/651* | (2014.01) |
| *H01M 4/505* | (2010.01) |
| *H01M 4/525* | (2010.01) |
| *H01M 10/0525* | (2010.01) |
| *H01M 10/647* | (2014.01) |
| *H01M 4/131* | (2010.01) |
| *H01M 4/02* | (2006.01) |
| *H01M 4/36* | (2006.01) |
| *H01M 10/0585* | (2010.01) |

(52) U.S. Cl.
CPC ......... *H01M 10/651* (2015.04); *H01M 4/131* (2013.01); *H01M 4/505* (2013.01); *H01M 4/525* (2013.01); *H01M 10/0413* (2013.01); *H01M 10/0525* (2013.01); *H01M 10/625* (2015.04); *H01M 10/647* (2015.04); *H01M 4/364* (2013.01); *H01M 10/0585* (2013.01); *H01M 2004/028* (2013.01); *H01M 2220/20* (2013.01); *Y02T 10/7011* (2013.01)

(58) Field of Classification Search
CPC ......... H01M 10/0413; H01M 10/0525; H01M 10/625; H01M 10/647; H01M 10/651; H01M 4/525; H01M 4/131; H01M 4/505; H01M 2220/20; H01M 4/364; H01M 10/0585; H01M 2004/028; Y02T 10/7011; Y02E 60/122
See application file for complete search history.

(56) References Cited

U.S. PATENT DOCUMENTS

| | | | |
|---|---|---|---|
| 6,682,850 | B1 | 1/2004 | Numata et al. |
| 2007/0212609 | A1 | 9/2007 | Iwami |
| 2010/0167118 | A1 | 7/2010 | Liu et al. |
| 2012/0121967 | A1 | 5/2012 | Nakamura et al. |
| 2013/0004826 | A1* | 1/2013 | Li .................. H01M 2/1686 429/144 |
| 2015/0318571 | A1* | 11/2015 | Baba ................ H01M 4/136 429/338 |
| 2015/0325822 | A1* | 11/2015 | Ichikawa ........... H01M 2/0275 429/185 |
| 2016/0276668 | A1* | 9/2016 | Nagayama .......... H01M 4/587 |

FOREIGN PATENT DOCUMENTS

| | | |
|---|---|---|
| EP | 2600444 A2 | 6/2013 |
| JP | 2006054189 A | 2/2006 |
| JP | 2010198899 A | 9/2010 |
| JP | 2011054334 A | 3/2011 |
| JP | 2011238416 A | 11/2011 |
| JP | 2012109124 A | 6/2012 |
| JP | 2012109125 A | 6/2012 |
| JP | 2013054973 A | 3/2013 |
| JP | 2014007034 A | 1/2014 |

OTHER PUBLICATIONS

Ming Hai, et al., Gradient V2O5 surface-coated LiMn2O4 cathode towards enhanced performance in Li-ion battery applications, Electrochimica Acta, Elsevier Science, Dec. 30, 2013, pp. 390-397, vol. 120.

Maleki et al., Thermal Properties of Lithium-Ion Battery and Components, Journal of the Electrochemical Society, 146 (3) 947-954 (1999).

\* cited by examiner

*Primary Examiner* — Muhammad S Siddiquee
(74) *Attorney, Agent, or Firm* — Young Basile Hanlon & MacFarlane, P.C.

(57) ABSTRACT

A non-aqueous electrolyte secondary battery includes a power generating element having a positive electrode having a positive electrode active material layer containing lithium-nickel-manganese-cobalt composite oxide on a surface of a current collector, an electrolyte layer, and a negative electrode. At least one of the following conditions (1) to (4) is satisfied. (1) A value obtained by dividing a direct current resistance of the battery by a heat resistance in a plane direction of the battery is 0.055 or more; (2) a value obtained by dividing a direct current resistance of the battery by a heat capacity of the battery is $3.080 \times 10^{-6}$ or more; (3) a value obtained by dividing a battery capacity by a heat resistance in a plane direction of the battery is 880 or more; and (4) a value obtained by dividing a battery capacity by a heat capacity of the battery is 0.05000 or more.

7 Claims, 2 Drawing Sheets

NON-AQUEOUS ELECTROLYTE SECONDARY BATTERY

CROSS REFERENCE TO RELATED APPLICATION

The present application claims priority to Japanese Patent Application No. 2014-082257 filed on Apr. 11, 2014, incorporated by reference in its entirety.

TECHNICAL FIELD

The present invention relates to a non-aqueous electrolyte secondary battery. More particularly, it relates to a technology for improving cycle characteristics in a non-aqueous electrolyte secondary battery which contains lithium-nickel-manganese-cobalt composite oxide as a positive electrode active material.

BACKGROUND

Currently, a non-aqueous electrolyte secondary battery including a lithium ion secondary battery that is utilized for a mobile device such as a mobile phone is available as a commercial product. The non-aqueous electrolyte secondary battery generally has a constitution that a positive electrode having a positive electrode active material and the like coated on a current collector and a negative electrode having a negative electrode active material and the like coated on a current collector are connected to each other via an electrolyte layer in which a non-aqueous electrolyte solution or a non-electrolyte gel is held in a separator. The charge and discharge reactions of a battery occur as the ions such as lithium ions are absorbed into and desorbed from an electrode active material.

In recent years it has been desired to reduce the amount of carbon dioxide in order to cope with the global warming. Hence, a non-aqueous electrolyte secondary battery having a small environmental burden has been utilized not only in a mobile device but also in a power source device of electric vehicles such as a hybrid vehicle (HEV), an electric vehicle (EV), and a fuel cell vehicle.

As the non-aqueous electrolyte secondary battery for application to the electric vehicles, it is required to have a high output and a high capacity. As the positive electrode active material used in the positive electrode of a non-aqueous electrolyte secondary battery for an electric vehicle, a lithium-cobalt-based composite oxide that is a layered composite oxide has already been widely put into practical use since it can provide a high voltage of a 4V-class and has a high energy density. However, cobalt of a raw material thereof is lacking as a natural resource and expensive so as to be anxious in terms of raw material supply when a possibility that the demand for cobalt is going to significantly increase in the future is taken into consideration. In addition, there is also a possibility that the raw material price of cobalt increases. Hence, a composite oxide containing cobalt at a lower content ratio is desired.

Spinel type lithium manganese composite oxide ($LiMn_2O_4$) has a spinel structure and functions as a 4V-class positive electrode material in the composition with $\lambda$-$MnO_2$. Spinel type lithium manganese composite oxide has a three-dimensional host structure that is different from the layered structure of $LiCoO_2$ and the like, and thus most of the theoretical capacity is usable so as to be expected to exhibit excellent cycle characteristics.

In practice, however, a lithium ion secondary battery using spinel type lithium manganese composite oxide as the positive electrode material cannot avoid the deterioration in capacity that the capacity gradually decreases as charge and discharge are repeated, and there is still a major problem for the practical application thereof.

As a technology for solving such a problem of spinel type lithium manganese composite oxide, a technology to concurrently use spinel type lithium manganese composite oxide and layered lithium-nickel-manganese-(cobalt) composite oxide containing Ni in a predetermined amount as the positive electrode material is disclosed in JP 2011-54334 A. According to JP 2011-54334 A, it is possible to provide a lithium ion secondary battery capable of achieving both a high output and a long lifespan by taking such a constitution.

SUMMARY

However, according to the investigations carried out by the present inventors, there is a case in which the cycle characteristics are not necessarily sufficient even when the technology described in JP 2011-54334 A is applied. In particular, it has been demonstrated that such deterioration in capacity due to repeated charge and discharge can significantly occur in the case of using lithium-nickel-manganese-cobalt composite oxide as a positive electrode active material.

Accordingly, an object of the present invention is to provide a means capable of exerting sufficient cycle characteristics in a non-aqueous electrolyte secondary battery which contains lithium-nickel-manganese-cobalt composite oxide as a positive electrode active material.

The present inventors have carried out intensive researches in order to solve the above problem. As a result, it has been found out that the above problem can be solved by controlling the heat release extent or heat capacity with respect to the direct current resistance or capacity in the battery, thereby completing the present invention.

In other words, the non-aqueous electrolyte secondary battery of the present invention includes a power generating element formed by stacking a positive electrode obtained by forming a positive electrode active material layer containing lithium-nickel-manganese-cobalt composite oxide on a surface of a current collector, an electrolyte layer, and a negative electrode. In addition, at least one of the following conditions (1) to (4) is satisfied in the non-aqueous electrolyte secondary battery.

(1) A value obtained by dividing a direct current resistance [$\Omega$] of the battery by a heat resistance [$(m \cdot K)/W$] in a plane direction of the battery is 0.055 or more;

(2) a value obtained by dividing a direct current resistance [$\Omega$] of the battery by a heat capacity [$J/K$] of the battery is $3.080 \times 10^{-6}$ or more;

(3) a value obtained by dividing a battery capacity [Ah] by a heat resistance [$(m \cdot K)/W$] in a plane direction of the battery is 880 or more; and (4) a value obtained by dividing a battery capacity [Ah] by a heat capacity [$J/K$] of the battery is 0.05000 or more.

DETAILED DESCRIPTION OF THE EMBODIMENTS

The non-aqueous electrolyte secondary battery according to an aspect of the present invention includes a power generating element formed by stacking a positive electrode obtained by forming a positive electrode active material layer containing lithium-nickel-manganese-cobalt composite oxide on a surface of a current collector, an electrolyte layer, and a negative electrode. In addition, at least one of the following conditions (1) to (4) is satisfied in the non-aqueous electrolyte secondary battery. (1) A value obtained by dividing a direct current resistance [Ω] of the battery by a heat resistance [(m·K)/W] in a plane direction of the battery is 0.055 or more; (2) a value obtained by dividing a direct current resistance [Ω] of the battery by a heat capacity [J/K] of the battery is $3.080 \times 10^{-6}$ or more; (3) a value obtained by dividing a battery capacity [Ah] by a heat resistance [(m·K)/W] in a plane direction of the battery is 880 or more; and (4) a value obtained by dividing a battery capacity [Ah] by a heat capacity [J/K] of the battery is 0.05000 or more.

The non-aqueous electrolyte secondary battery of the present aspect exhibits sufficient heat releasing properties with respect to the amount of heat generated in the battery by the constitution described above, and thus it is possible to prevent a local temperature increase in the inside of the battery. As a result, thermal deterioration of lithium-nickel-manganese-cobalt composite oxide is suppressed, and it is possible to exert sufficient cycle characteristics in the non-aqueous electrolyte secondary battery.

Hereinafter, embodiments of the present invention will be described with reference to the accompanying drawings. Incidentally, the same elements are given with the same symbols for the descriptions of the drawings, and overlapped descriptions are omitted. Further, note that dimensional ratios in the drawings are exaggerated for the convenience of description, and are different from actual ratios in some cases.

<Non-Aqueous Electrolyte Secondary Battery>

Figure 1:
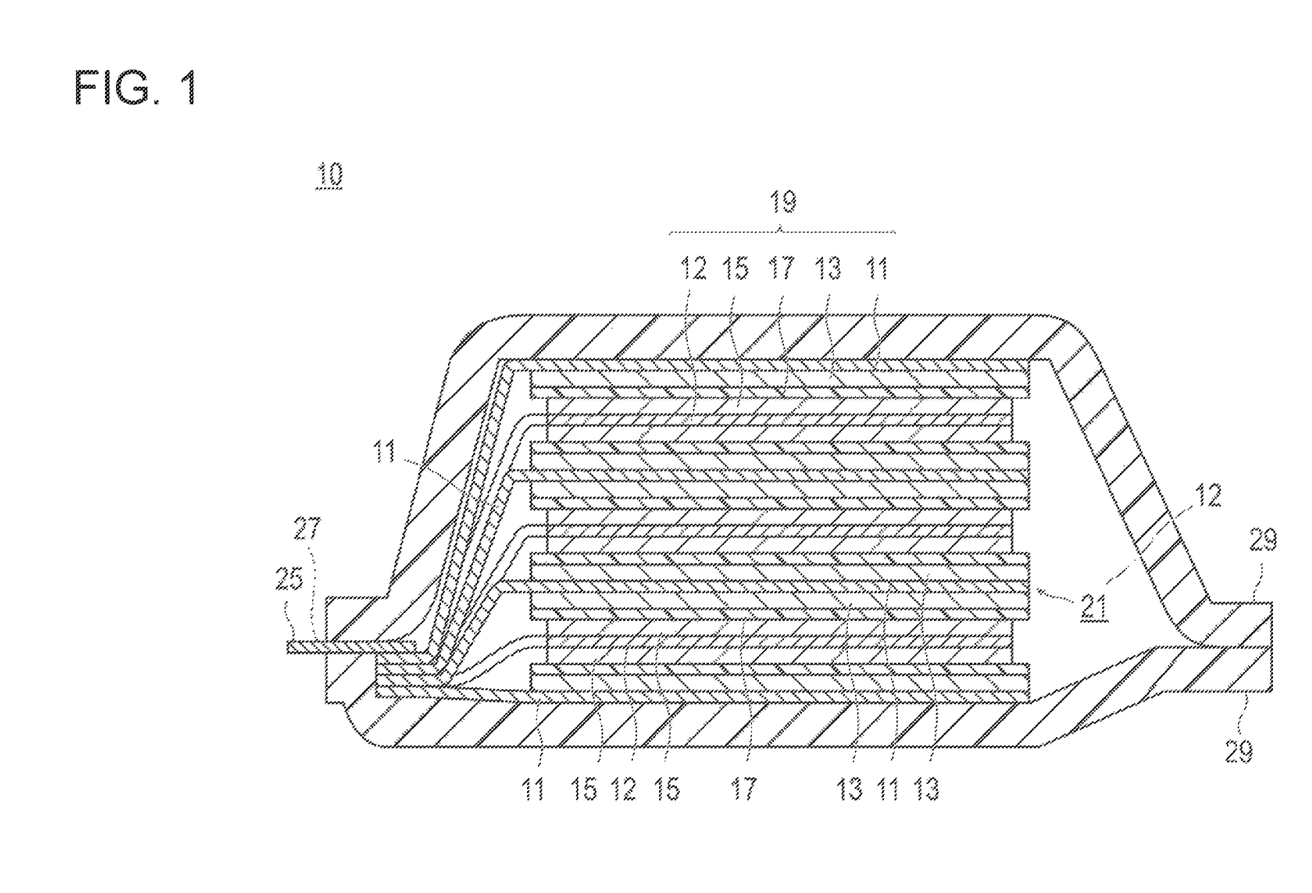
FIG. 1 is a cross-sectional view which schematically illustrates the basic constitution of a lithium ion secondary battery that is an embodiment of a non-aqueous electrolyte secondary battery and is a flat type (stack type) but not a bipolar type. It is a schematic cross-sectional view taken along the line A-A illustrated in FIG. 2.

First, the overall structure of the non-aqueous electrolyte secondary battery of the present invention will be described with reference to the drawings. FIG. 1 is a cross-sectional view which schematically illustrates the outline of a lithium ion secondary battery as an embodiment of the present invention. Incidentally, in the present specification, a lithium ion secondary battery that is a flat type (stack type) but not a bipolar type and is illustrated in FIG. 1 will be described in detail as an example, but the technical scope of the present invention is not limited to only such an aspect.

[Overall Structure of Battery]

FIG. 1 is a cross-sectional view which schematically illustrates the basic constitution of a lithium ion secondary battery which is a flat type (stack type) but not a bipolar type (hereinafter, also simply referred to as a "stack type battery"). As illustrated in FIG. 1, a lithium ion secondary battery 10 according to the present embodiment has a structure in which a roughly rectangular shaped power generating element 21 in which charge and discharge reactions actually progress is sealed in the inside of a battery outer casing material 29 of an outer casing body. Here, the power generating element 21 has a constitution in which a positive electrode, a separator 17, and a negative electrode are stacked. Incidentally, the separator 17 has a non-aqueous electrolyte (for example, liquid electrolyte) within it. The positive electrode has a structure in which a positive electrode active material layer 15 is disposed on both surfaces of a positive electrode current collector 12. The negative electrode has a structure in which a negative electrode active material layer 13 is disposed on both surfaces of a negative electrode current collector 11. Specifically, the negative electrode, the electrolyte layer and the positive electrode are stacked in this order such that one positive electrode active material layer 15 and the negative electrode active material layer 13 adjacent to this face each other via the separator 17. Accordingly, the adjacent positive electrode, electrolyte layer, and negative electrode constitute one single battery layer 19. Hence, it can also be said that the lithium ion secondary battery 10 illustrated in FIG. 1 has a constitution in which plural single battery layers 19 are stacked to be electrically connected in parallel.

Incidentally, the negative electrode active material layer 13 is disposed only on one surface of both the outermost layer negative electrode current collectors positioned on both outermost layers of the power generating element 21, but the active material layer may be formed on both surfaces thereof. In other words, a current collector for an outermost layer in which an active material layer is formed only on one surface is not used but a current collector having an active material layer on both surfaces may be directly used as the current collector of the outermost layer. In addition, the positive electrode active material layer may be disposed on one surface the outermost layer positive electrode current collector by reversing the disposition of positive electrode and negative electrode in FIG. 1 so that the outermost layer positive electrode current collector is disposed on both outermost layers of the power generating element 21.

The positive electrode current collector 12 and negative electrode current collector 11 may have a structure in which a positive electrode current collecting plate (tab) 27 and a negative electrode current collecting plate (tab) 25, which conductively communicate with the respective electrodes (positive electrode and negative electrode), are respectively attached to the positive electrode current collector 12 and negative electrode current collector 11 and led to the outside of the battery outer casing material 29 so as to be inserted between the end parts of the battery outer casing material 29. If necessary, the positive electrode current collecting plate 27 and negative electrode current collecting plate 25 may be respectively attached to the positive electrode current collector 12 and negative electrode current collector 11 of the respective electrodes via a positive electrode lead and a negative electrode lead (not illustrated) by ultrasonic welding, resistance welding, or the like.

Incidentally, although a lithium ion secondary battery that is a flat type (stack type) but not a bipolar type is illustrated in FIG. 1, it may be a bipolar type battery including a bipolar type electrode which has a positive electrode active material layer electrically bound to one surface of a current collector and a negative electrode active material layer electrically bound to the opposite surface of the current collector. In this case, one current collector plays roles of both the positive electrode current collector and the negative electrode current collector. Hereinafter, the respective members which constitute a lithium ion secondary battery of an embodiment of the present invention will be described.

[Positive Electrode]

The positive electrode is obtained by forming a positive electrode active material layer containing a positive electrode active material on the surface of a current collector. The positive electrode has a function to generate electric energy by receiving and donating lithium ions together with the negative electrode.

(Current Collector)

The current collector is constituted by a conductive material, and the positive electrode active material layer is disposed on one surface or both surfaces thereof. The material constituting the current collector is not particularly limited, and for example, a metal or a conductive resin in which a conductive polymer material or a non-conductive polymer material is doped with a conductive filler can be employed.

Specific examples of the metal may include aluminum, nickel, iron, stainless steel (SUS), titanium, and copper. In addition to these, a clad material of nickel and aluminum, a clad material of copper and aluminum, or a plating material of a combination of these metals can be preferably used. In addition, it may be a foil obtained by coating aluminum on a metal surface. Among these, it is preferable to use aluminum, stainless steel, or copper from the viewpoint of the conductivity or the potential for operating the battery.

In addition, examples of the conductive polymer material may include polyaniline, polypyrrole, polythiophene, polyacetylene, polyparaphenylene, polyphenylene vinylene, polyacrylonitrile, and polyoxadiazole. Such conductive polymer materials are advantageous in terms of facilitation of the manufacturing process or weight saving of the current collector since they are sufficiently conductive even without being doped with a conductive filler.

Examples of the non-conductive polymer material may include polyethylene (PE; high density polyethylene (HDPE), low density polyethylene (LDPE)), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). Such non-conductive polymer materials can exhibit excellent resistance to potential or solvent.

The conductive polymer material or non-conductive polymer material described above can be doped with a conductive filler if necessary. Particularly in a case in which a resin to be the substrate of the current collector is composed only of a non-conductive polymer, inevitably a conductive filler is essential in order to impart conductivity to the resin. Any conductive filler can be used without particular limitation as long as it is a conductive substance. Examples of a material that is excellent in conductivity, resistance to potential, or lithium ion barrier properties may include a metal and conductive carbon. The metal is not particularly limited, but it is preferable to contain at least one kind of metal selected from the group consisting of Ni, Ti, Al, Cu, Pt, Fe, Cr, Sn, Zn, In, Sb, and K or an alloy or metal oxide containing these metals. In addition, the conductive carbon is not particularly limited, but it is preferable to contain at least one kind selected from the group consisting of acetylene black, Vulcan (registered trademark), black pearl (registered trademark), carbon nanofibers, Ketjen Black (registered trademark), carbon nanotubes, carbon nanohorns, carbon nanoballoons, and fullerenes. The addition amount of the conductive filler is not particularly limited as long as it is an amount capable of imparting sufficient conductivity to the current collector, and it is generally about from 5 to 35% by mass.

The size of the current collector is determined depending on the use of the battery. A current collector having a large area is used, for example, when the current collector is used in a large-size battery which requires a high energy density. The thickness of the current collector is not particularly limited as well, but it is generally about from 1 to 100 μm.

(Positive Electrode Active Material Layer)

In the present aspect, the positive electrode active material layer essentially contains lithium-nickel-manganese-cobalt composite oxide (hereinafter, also referred to as "NMC composite oxide"), and it can contain other positive electrode active materials if necessary.

Lithium-nickel-manganese-cobalt composite oxide has a layered crystal structure in which a lithium atom layer and a transition metal (Mn, Ni, and Co are orderly disposed) atom layer are alternately stacked via an oxygen atom layer. Lithium-nickel-manganese-cobalt composite oxide contains one Li atom per one transition metal M atom, thus has a Li amount to be extracted twice the amount in spinel type lithium manganese composite oxide, namely, a supply capacity doubles, and it may have a high capacity. In addition, lithium-nickel-manganese-cobalt composite oxide has a high thermal stability, and thus it is particularly advantageous as a positive electrode active material.

In the present specification, NMC composite oxide also includes a composite oxide in which a part of the transition metal elements is substituted with other metal elements. Examples of the other elements in that case may include Ti, Zr, Nb, W, P, Al, Mg, V, Ca, Sr, Cr, Fe, B, Ga, In, Si, Mo, Y, Sn, V, Cu, Ag, and Zn, preferably Ti, Zr, Nb, W, P, Al, Mg, V, Ca, Sr, and Cr, more preferably, Ti, Zr, P, Al, Mg, and Cr, and even more preferably Ti, Zr, Al, Mg, and Cr from the viewpoint of the improvement in cycle characteristics.

NMC composite oxide preferably has a composition represented by the General Formula: $Li_aNi_bMn_cCo_dM_xO_2$ (in the General Formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$; M represents at least one kind selected from the group consisting of Ti, Zr, Nb, W, P, Al, Mg, V, Ca, Sr, and Cr) since the theoretical discharge capacity is high. Here, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that b meets $0.4 \leq b \leq 0.6$ in the General Formula (1). Incidentally, the composition of the respective elements can be measured by induction coupled plasma (ICP) spectroscopy. Incidentally, NMC composite oxide may be used singly or in combination of two or more kinds thereof.

In general, nickel (Ni), cobalt (Co) and manganese (Mn) are known to contribute to the capacity and output characteristics from the viewpoint of the improvement in purity and electron conductivity of the material. A part of the transition metals in the crystal lattice is substituted with Ti and the like. It is preferable that a part of transition element is substituted with other metal element and in particular, it is preferable that x meets $0 \leq x \leq 0.3$ in the General Formula (1) from the viewpoint of the cycle characteristics. The crystal structure is stabilized as at least one kind selected from the group consisting of Ti, Zr, Nb, W, P, Al, Mg, V, Ca, Sr and Cr is dissolved as a solid solution, thus a decrease in capacity of a battery is prevented even charge and discharge are repeated and it is believed that excellent cycle characteristics can be achieved.

Furthermore, a positive electrode active material of a composite oxide in which b, c, and d in the General Formula (1) satisfy $0.44 \leq b \leq 0.51$, $0.27 \leq c \leq 0.31$, and $0.19 \leq d \leq 0.26$ is preferable from the viewpoint of improving balance between capacity and lifespan characteristics.

The lithium nickel-based composite oxide such as NMC composite oxide can be produced by selecting various known methods such as a molten-salt method, co-precipitation method and a spray drying method. It is preferable to use a co-precipitation method since the production of the composite oxide according to the present aspect is easy. Specifically, as a method for synthesizing NMC composite oxide, NMC composite oxide can be obtained, for example, by the method described in JP-A-2011-105588, in which a nickel-cobalt-manganese composite oxide is produced by the co-precipitation method, the nickel-cobalt-manganese composite oxide is then mixed with a lithium compound, and the mixture is calcined.

In the present aspect, the positive electrode active material layer may contain other positive electrode active materials other than NMC composite oxide described above. The other positive electrode active materials are not particularly limited, but examples thereof may include $LiMn_2O_4$, $LiCoO_2$, $LiNiO_2$, a layered lithium-transition metal composite oxide in which a part of these transition metals are substituted with the other elements described above, a lithium-transition metal phosphoric acid compound, a lithium-transition metal sulfuric acid compound, and spinel type lithium manganese composite oxide. These other positive electrode active materials may be used singly or in combination of two or more kinds thereof.

The content of the other positive electrode active materials with respect to the total amount of the positive electrode active materials contained in the positive electrode active material layer is not particularly limited, but it is preferably 80% by mass or less, more preferably 50% by mass or less, and even more preferably 0% by mass (namely, containing only NMC composite oxide as the positive electrode active material) from the viewpoint of further exerting the effect of the present invention.

The average particle diameter of the positive electrode active material is not particularly limited, but the average particle diameter of the secondary particles is preferably from 6 to 11 μm and more preferably from 7 to 10 μm from the viewpoint of a high output. In addition, the average particle diameter of the primary particles is preferably from 0.4 to 0.65 μm and more preferably from 0.45 to 0.55 μm. Incidentally, the "particle diameter" in the present specification means the maximum distance L among the distances between arbitrary two points on the contour line of a particle. In addition, as the value of the "average particle diameter", the value calculated as an average value of the particle diameters of particles observed in from several to several tens of visual fields by using an observation means such as a scanning electron microscope (SEM) or a transmission electron microscope (TEM) is adopted.

If necessary, the positive electrode active material layer further contains other additives such as a conductive aid, a binder, an electrolyte (a polymer matrix, an ion conductive polymer, an electrolyte solution, and the like), and a lithium salt for enhancing ion conductivity in addition to the positive electrode active material which has described above. However, the content of the material that can function as an active material is preferably from 85 to 99.5% by weight in the positive electrode active material layer and the negative electrode active material layer to be described later.

A binder used in the positive electrode active material layer is not particularly limited, and for example, the following materials may be mentioned. Thermoplastic polymers such as polyethylene, polypropylene, polyethylene terephthalate (PET), polyether nitrile, polyacrylonitrile, polyimide, polyamide, cellulose, carboxymethyl cellulose (CMC) and any salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber), an epoxy resin, and the like are exemplified. These binders may be used singly, or two or more kinds thereof may be used concurrently.

The amount of the binder contained in the positive electrode active material layer is not particularly limited as long as the binder can bind the active material. However, the amount of the binder is preferably from 0.5 to 15% by weight and more preferably from 1 to 10% by weight with respect to the active material layer.

The positive electrode active material layer further contains other additives such as a conductive aid, an electrolyte (polymer matrix, an ion conductive polymer, an electrolytic solution, and the like), and a lithium salt for enhancing ion conductivity if necessary.

The conductive aid is an additive to be blended in order to improve the conductivity of the positive electrode active material layer or the negative electrode active material layer. Examples of the conductive aid may include a carbon material such as carbon black including Ketjen black and acetylene black or a carbon fiber. The electron network is effectively formed in the inside of the active material layer when the active material layer contains a conductive aid, which can contribute to the improvement in output characteristics of the battery.

Examples of the electrolyte salt (lithium salt) may include $Li(C_2F_5SO_2)_2N$, $LiPF_6$, $LiBF_4$, $LiClO_4$, $LiAsF_6$, and $LiCF_3SO_3$.

Examples of the ion conductive polymer include a polyethylene oxide (PEO)-based polymer and a polypropylene oxide (PPO)-based polymer.

The thickness of each active material layer is not particularly limited, and the known knowledge on a battery can be appropriately referred to. As an example, the thickness of the positive electrode active material layer is about from 2 to 100 μm.

[Negative Electrode]

The negative electrode is obtained by forming a negative electrode active material layer on the surface of a current collector. The negative electrode has a function to generate electric energy by receiving and donating lithium ions together with the positive electrode.

(Current Collector)

The current collector which can be used in the negative electrode is the same as the current collector which can be used in the positive electrode, and the description thereon is omitted here.

[Negative Electrode Active Material Layer]

The negative electrode active material layer contains a negative electrode active material, and if necessary, further contains other additives such as a conductive aid, a binder, an electrolyte (a polymer matrix, an ion conductive polymer, an electrolyte solution, and the like), and a lithium salt for enhancing ion conductivity. The other additives such as a conductive aid, a binder, an electrolyte (a polymer matrix, an ion conductive polymer, an electrolyte solution, and the like), and a lithium salt for enhancing ion conductivity are the same as those described above in the section of the positive electrode active material layer.

The negative electrode active material has a composition which can desorb lithium ions at the time of discharge and absorb lithium ions at the time of charge. The negative electrode active material is not particularly limited as long as it can reversibly absorb and desorb lithium, but examples of the negative electrode active material may preferably include a metal such as Si or Sn, a metal oxide such as TiO, $Ti_2O_3$, $TiO_2$, $SiO_2$, SiO, or $SnO_2$, a composite oxide of lithium and transition metals such as $Li_{4/3}Ti_{5/3}O_4$ or $Li_7MnN$, a Li—Pb alloy, a Li—Al alloy, Li, or a carbon material such as a carbon powder, natural graphite, artificial graphite, carbon black, activated carbon, carbon fiber, coke, soft carbon, or hard carbon. It is possible to obtain a battery which has a higher energy density than a carbon-based material of prior art and a high capacity and is excellent in output characteristics by using an element that is alloyed with lithium among these. The negative active materials may be used singly or in the form of a mixture of two or more kinds thereof. Although the element that is alloyed with lithium is not limited to the following ones, examples of the element may specifically include Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, and Cl.

Among the negative electrode active materials, it is preferable to contain a carbon material and/or at least one or more kinds of elements selected from the group consisting of Si, Ge, Sn, Pb, Al, In, and Zn, it is more preferable to contain a carbon material or an element of Si or Sn, and it is particularly preferable to use a carbon material.

As the carbon material, carbonaceous particles having a lower discharge potential as compared to lithium is preferable, and for example, natural graphite, artificial graphite, a blend of natural graphite and artificial graphite, a material obtained by coating an amorphous substance on natural graphite, soft carbon, and hard carbon can be used. The shape of the carbonaceous particles is not particularly limited, and it may be any shape of a lumpy shape, a spherical shape, or a fibrous shape, but it is preferable that the shape is not a flaky shape but is a spherical shape or a lumpy shape. Those that are not flaky are preferable from the viewpoint of performance and durability.

In addition, the carbonaceous particles are preferably those that are obtained by covering the surface thereof with amorphous carbon. At this time, it is more preferable that the entire surface of the carbonaceous particles is covered with the amorphous carbon, but only a portion of the surface may be covered with the amorphous carbon. The reaction between the graphite and the electrolytic solution at the time of charge and discharge of the battery can be prevented as the surface of the carbonaceous particles is covered with amorphous carbon. The method for covering the surface of the graphite particles with the amorphous carbon is not particularly limited. Examples thereof may include a wet method in which carbonaceous particles (powder) to be the core are dispersed and mixed in a mixed solution prepared by dissolving or dispersing amorphous carbon in a solvent and the solvent is then removed. Other examples thereof may include a dry method in which carbonaceous particles and amorphous carbon are mixed together in the form of a solid and a mechanical energy is applied to the mixture to cover the carbonaceous particles with the amorphous carbon, or a vapor phase method such as a CVD method. It can be confirmed that carbonaceous particles are covered with amorphous carbon by a method such as laser spectroscopy.

The average particle diameter of the negative electrode active material is not particularly limited, but it is preferably from 1 to 100 μm and more preferably from 1 to 20 μm from the viewpoint of an increase capacity, reactivity, and cycle durability.

The negative electrode active material layer preferably contains at least an aqueous binder. The aqueous binder exhibits high binding property. In addition, procurement of water as a raw material is easy and also only water vapor is generated during drying, and thus there is an advantage that the investment on facilities of a production line can be greatly cut down and a decrease in environmental burden can be achieved.

The aqueous binder refers to a binder which has water as a solvent or a dispersion medium, and specific examples thereof include a thermoplastic resin, a polymer exhibiting rubber elasticity, a water-soluble polymer, and any mixture thereof. Here, the binder which contains water as a dispersion medium includes all which are regarded as latex or an emulsion, and it refers to a polymer that is emulsified in water or suspended in water. Examples thereof may include a polymer latex obtained by emulsion polymerization in a self-emulsifying system.

Specific examples of the aqueous binder may include a styrene polymer (styrene-butadiene rubber, a styrene-vinyl acetic acid copolymer, styrene-acryl copolymer or the like), acrylonitrile-butadiene rubber, methyl methacrylate-butadiene rubber, (meth)acrylic polymer (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate, polylauryl methacrylate, or the like), polytetrafluoroethylene, polyethylene, polypropylene, an ethylene-propylene copolymer, polybutadiene, butyl rubber, fluorine rubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (the average polymerization degree is suitably from 200 to 4000 and more suitably from 1000 to 3000, and the saponification degree is suitably 80% by mol or more and more suitably 90% by mol or more) and any modified product thereof (a product obtained by saponifying from 1 to 80% by mol of the vinyl acetate units in a copolymer of ethylene/vinyl acetate=2/98 to 30/70 (molar ratio), a product obtained by partially acetalizing polyvinyl alcohol at from 1 to 50% by mol, or the like), starch and any modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, and any salt thereof), polyvinylpyrrolidone, polyacrylic acid (salt), polyethylene gylcol, a copolymer of (meth)acrylamide and/or a (meth)acrylate salt [(meth)acrylamide polymer, a (meth) acrylamide-(meth)acrylate salt copolymer, a (meth) acrylic acid alkyl (having from 1 to 4 carbon atoms) ester-(meth) acrylate salt copolymer, or the like], a styrene-maleate salt copolymer, a mannich modified product of polyacrylamide, a formalin condensation type resin (a urea-formalin resin, a melamin-formalin resin or the like), a polyamide polyamine or dialkylamine-epichlorohydrin copolymer, polyethyleneimine, casein, soybean protein, synthetic protein, and a water-soluble polymer such as any galactan mannan derivative. These aqueous binders may be used singly or two or more kinds thereof may be used concurrently.

From the viewpoint of binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Furthermore, the aqueous binder preferably contains styrene-butadiene rubber since the binding property thereof is favorable.

In the case of using styrene-butadiene rubber as the aqueous binder, it is preferable to concurrently use the aforementioned water-soluble polymer from the viewpoint of the improvement in coating property. Examples of the water-soluble polymer which is suitably concurrently used with styrene-butadiene rubber may include polyvinyl alcohol and any modified product thereof, starch and any modified product thereof, cellulose derivatives (carboxymethyl cellulose, methyl cellulose, hydroxyethyl cellulose, and any salt thereof), polyvinylpyrrolidone, polyacrylic acid (salt), or polyethylene glycol. Among them, styrene-butadiene rubber and carboxymethyl cellulose (salt) are preferably combined as a binder. The weight content ratio of the styrene-butadiene rubber to the water-soluble polymer is not particularly limited, but it is preferable that the ratio of styrene-butadiene rubber:water-soluble polymer is 1:0.1 to 10 and more preferably from 1:0.5 to 2.

In the binder used in the negative electrode active material layer, the content of the aqueous binder is preferably from 80 to 100% by weight, preferably from 90 to 100% by weight, and preferably 100% by weight.

[Separator (Electrolyte Layer)]

A separator has a function to hold the electrolyte so as to secure the lithium ion conductivity in between the positive electrode and the negative electrode and also a function as a partition wall between the positive electrode and the negative electrode.

Examples of the separator shape may include a porous sheet separator or a non-woven separator composed of a polymer or a fiber which absorbs and holds the electrolyte.

As the porous sheet separator composed of a polymer or a fiber, a microporous (microporous membrane) separator can be used, for example. Specific examples of the porous sheet composed of a polymer or a fiber may include a microporous (microporous membrane) separator which is composed of a polyolefin such as polyethylene (PE) or polypropylene (PP); a laminate in which a plurality of these are laminated (for example, a laminate having a three-layer structure of PP/PE/PP), and a hydrocarbon-based resin such as polyimide, aramid, or polyvinylidene fluoride-hexafluoropropylene (PVdF-HFP), or a glass fiber.

The thickness of the microporous (microporous membrane) separator cannot be uniformly defined as it varies depending on the use. For example, for use in a secondary battery for driving a motor of an electric vehicle (EV), a hybrid electric vehicle (HEV), a fuel cell vehicle (FCV), and the like, it is preferably from 4 to 60 µm as a monolayer or a multilayer. Fine pore diameter of the microporous (microporous membrane) separator is preferably 1 µm or less at most (usually, the pore diameter is about several tens of nanometers).

As the non-woven separator, those known in prior art, such as cotton, rayon, acetate, nylon, polyester; a polyolefin such as PP or PE; polyimide and aramid are used singly or as a mixture. In addition, the bulk density of the non-woven fabric is not particularly limited as long as sufficient battery characteristics are obtained by a polymer gel electrolyte impregnated into the non-woven fabric. Furthermore, it is sufficient that the thickness of the non-woven separator is the same as that of the electrolyte layer. It is preferably from 5 to 200 µm and even more preferably from 10 to 100 µm.

In addition, as described above, the separator also contains an electrolyte. In the electric device according to the present aspect, it is preferable that the electrolyte contains a cyclic sulfonic acid ester as an additive. The specific constitution of the cyclic sulfonic acid ester is not particularly limited, and the knowledge known in prior art can be appropriately referred to. Examples of the cyclic sulfonic acid ester may include 1,3-propane sultone, 1,3-propene sultone, and methylene methanedisulfonic acid ester, and those described in JP 2011-209011 A may be used in the same manner.

Incidentally, the electrolyte may further contain additives other than the cyclic sulfonic acid ester described above. Specific examples of such additives may include vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinyl vinylene carbonate, allyl ethylene carbonate, vinyloxymethyl ethylene carbonate, allyloxymethyl ethylene carbonate, acryloxymethyl ethylene carbonate, methacryloxymethyl ethylene carbonate, ethynyl ethylene carbonate, propargyl ethylene carbonate, ethynyloxymethyl ethylene carbonate, propargyloxyethylene carbonate, methylene ethylene carbonate, and 1,1-dimethyl-2-methyleneethylene carbonate. Among them, vinylene carbonate, methyl vinylene carbonate, and vinyl ethylene carbonate are preferable, and vinylene carbonate and vinyl ethylene carbonate are more preferable. These cyclic carbonate esters may be used singly or two or more kinds thereof may be used concurrently.

The electrolyte is not particularly limited as long as it can function as a carrier of lithium ions, but a liquid electrolyte or a gel polymer electrolyte is used. By using a gel polymer electrolyte, the stabilization of the distance between the electrodes is achieved, the generation of polarization is suppressed, and the durability (cycle characteristics) is improved.

The liquid electrolyte has a form in which a lithium salt is dissolved in an organic solvent. Examples of the organic solvent to be used may include a carbonate such as ethylene carbonate (EC), propylene carbonate (PC), dimethyl carbonate (DMC), diethyl carbonate (DEC), or ethyl methyl carbonate. In addition, as the lithium salt, the compounds that can be added to the active material layer of the electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be employed in the same manner.

The gel polymer electrolyte has a constitution that the aforementioned liquid electrolyte is injected into a matrix polymer (host polymer) consisting of an ion conductive polymer. Using a gel polymer electrolyte as an electrolyte is excellent in that the fluidity of the electrolyte disappears and ion conductivity between the respective layers is blocked. Examples of the ion conductive polymer which is used as the matrix polymer (host polymer) may include polyethylene oxide (PEO), polypropylene oxide (PPO), polyethylene glycol (PEG), polyacrylronitrile (PAN), polyvinylidene fluoride-hexafluoropropylene (PVdF-HEP), poly(methyl methacrylate (PMMA) and any copolymer thereof.

The matrix polymer of a gel electrolyte can exhibit an excellent mechanical strength as it forms a cross-linked structure. In order to form a cross-linked structure, it is sufficient to conduct a polymerization treatment, such as thermal polymerization, UV polymerization, radiation polymerization, or electron beam polymerization, of a polymerizable polymer for forming a polymer electrolyte (for example, PEO or PPO) using a proper polymerization initiator.

In addition, as a separator, a separator in which a heat resistant insulating layer is laminated on a porous substrate (a separator with heat resistant insulating layer) is preferable. The heat resistant insulating layer is a ceramic layer containing inorganic particles and a binder. As the separator with heat resistant insulating layer, those exhibiting high heat resistance, namely having a melting point or a heat softening point of 150° C. or higher and preferably 200° C. or higher, are used. By having a heat resistant insulating layer, internal stress of the separator which increases when the temperature increases is alleviated so that the effect of suppressing thermal shrinkage can be obtained. As a result, an occurrence of a short circuit in between electrodes of the battery can be prevented so that a battery configuration in which the deterioration in performance due to an increase in temperature hardly occurs is obtained. In addition, by having a heat resistant insulating layer, the mechanical strength of the separator with heat resistant insulating layer is improved so that the membrane of the separator is hardly broken. Furthermore, because of the effect of suppressing thermal shrinkage and a high mechanical strength, the separator is hardly curled during the manufacturing process of the battery.

The inorganic particles in the heat resistant insulating layer contribute to the mechanical strength or the effect of suppressing thermal shrinkage of the heat resistant insulating layer. The material used as the inorganic particles is not particularly limited. Examples thereof may include oxides ($SiO_2$, $Al_2O_3$, $ZrO_2$, and $TiO_2$), hydroxides, and nitrides of silicon, aluminum, zirconium and titanium, and any composite thereof. These inorganic particles may be those which are derived from mineral resources such as boehmite, zeolite, apatite, kaolin, mullite, spinel, olivine, and mica, or those which are artificially synthesized. In addition, these inorganic particles may be used singly or two or more kinds thereof may be used concurrently. Among them, it is preferable to use silica ($SiO_2$) or alumina ($Al_2O_3$) and it is more preferable to use alumina ($Al_2O_3$) from the viewpoint of cost.

The weight per unit area of heat resistant particles is not particularly limited, but it is preferably from 5 to 15 $g/m^2$. It is desirable that the weight per unit area is within this range since sufficient ion conductivity is obtained and the heat resistant strength is maintained.

The binder in the heat resistant insulating layer has a role to bond the inorganic particles to one another or the inorganic particles to the resin porous substrate layer. The heat resistant insulating layer is stably formed by this binder and also peeling between the porous substrate layer and the heat resistant insulating layer is prevented.

The binder used in the heat resistant insulating layer is not particularly limited, and for example, compounds such as carboxymethyl cellulose (CMC), polyacrylronitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate can be used as the binder. Among these, carboxymethyl cellulose (CMC), methyl acrylate, or polyvinylidene fluoride (PVDF) is preferably used. These compounds may be used singly or two or more kinds thereof may be used concurrently.

The content of the binder in the heat resistant insulating layer is preferably from 2 to 20% by weight with respect to 100% by weight of the heat resistant insulating layer. When the content of binder is 2% by weight or more, the peeling strength between the heat resistant insulating layer and the porous substrate layer can be enhanced and vibration resistance of the separator can be improved. Incidentally, when the content of binder is 20% by weight or less, a gap between the inorganic particles is properly kept so that sufficient lithium ion conductivity can be secured.

It is preferable that the thermal shrinkage rate of the separator with heat resistant insulating layer is 10% or less in both MD and TD after being held for 1 hour under the condition of 150° C. and 2 $gf/cm^2$. Shrinkage of the separator can be effectively prevented even when the internal temperature of the battery reaches 150° C. due to an increased amount of heat generated from the positive electrode as such a highly heat resistant material is used. As a result, an occurrence of a short circuit in between electrodes of the battery can be prevented so that a battery configuration in which the deterioration in performance due to an increase in temperature hardly occurs is obtained.

[Positive Electrode Current Collecting Plate and Negative Electrode Current Collecting Plate]

The material constituting the current collecting plates (25, 27) is not particularly limited, and a known highly conductive material which has been used as a current collecting plate for a lithium ion secondary battery in prior art can be used. Preferred examples of the material constituting the current collecting plate may include metal materials such as aluminum, copper, titanium, nickel, stainless steel (SUS) and any alloy thereof. From the viewpoint of light weightiness, resistance to corrosion, and high conductivity, aluminum and copper are more preferable. Aluminum is even more preferable. Incidentally, the same material or different materials may be used in the positive electrode current collecting plate 27 and the negative electrode current collecting plate 25.

[Positive Electrode Lead and Negative Electrode Lead]

In addition, although it is not illustrated, the current collector 11 and the current collecting plate (25, 27) may be electrically connected to each other via a positive electrode lead or a negative electrode lead. A known material that is used in a lithium ion secondary battery of prior art can be used as the material constituting the positive electrode lead and the negative electrode lead in the same manner. Incidentally, a portion taken out from the outer casing is preferably coated with a heat resistant and insulating thermally shrunken tube or the like so that it is not in contact with the neighboring device or wire to cause electric leakage which affects the product (for example, an automobile component, in particular, an electronic device).

[Battery Outer Casing Material]

As the outer casing material, a metal can casing or a laminate film known in prior art can be used, however a laminate film is preferable from the viewpoint of an increase in output and excellent cooling performance and of being suitably utilizable in a battery for a large-size device such as EV or HEV. In addition, a laminate film comprising aluminum is more preferable as the outer casing body since the group pressure applied from the outside to the power generating element can be easily adjusted and thus the thickness of an electrolyte solution layer can be easily adjusted to a desired value. The laminate film can be configured, for example, as a three-layer structure obtained by laminating polypropylene, aluminum, and nylon in this order. By the use of such a laminate film, it is possible to easily conduct the opening of the outer casing material, the addition of capacity recovery material, and the re-sealing of the outer casing material.

[Cell Size]

Figure 2:
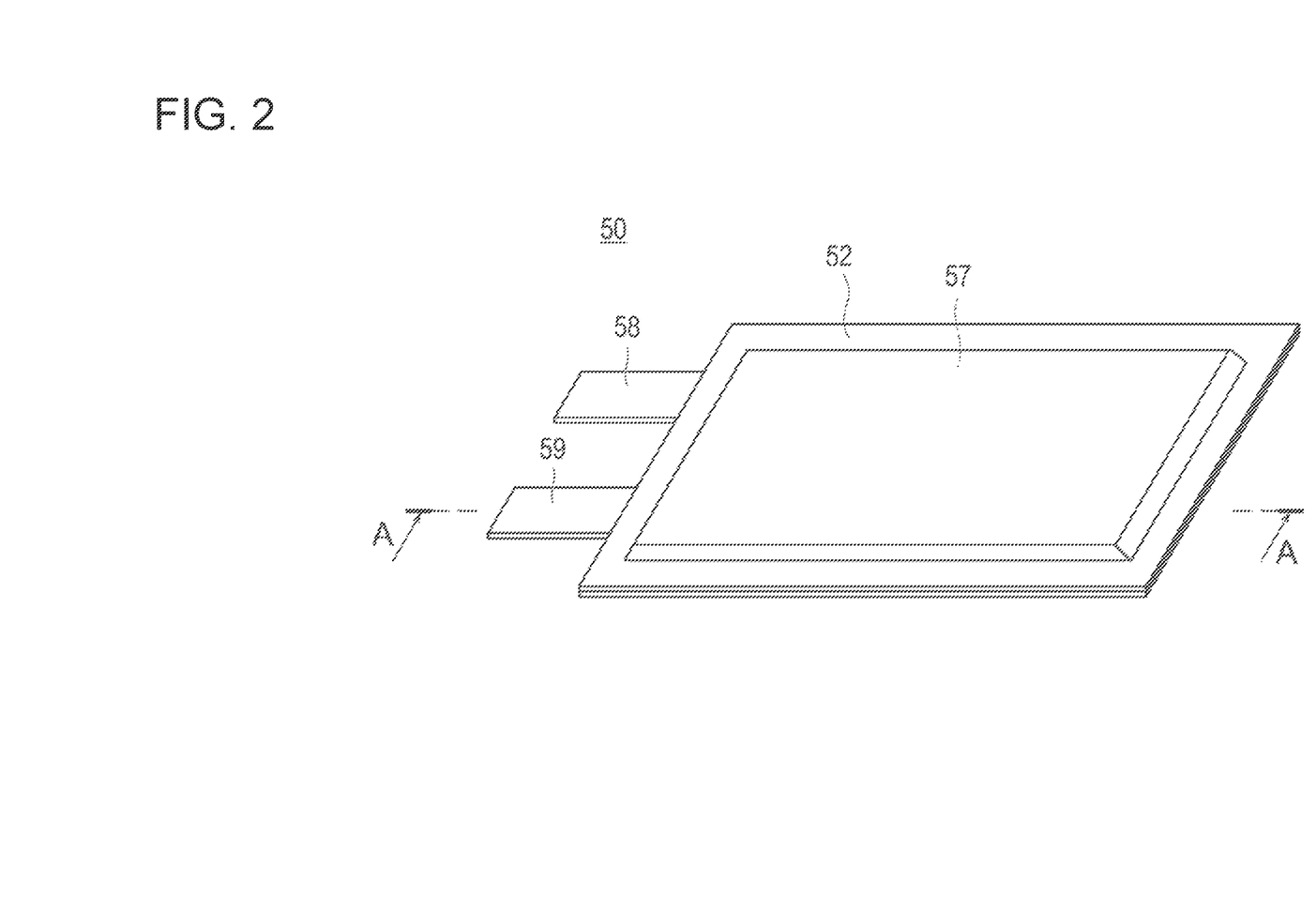
FIG. 2 is a perspective view which illustrates the appearance of a flat lithium ion secondary battery that is a representative embodiment of a non-aqueous electrolyte secondary battery.

FIG. 2 is a perspective view illustrating the appearance of a flat lithium ion secondary battery as a representative embodiment of a non-aqueous electrolyte secondary battery. According to a preferred embodiment of the present invention, a flat stack type laminate battery having a constitution in which the power generating element is sealed in the battery outer casing body formed of a laminate film containing aluminum such as this lithium ion secondary battery is provided.

As illustrated in FIG. 2, a flat lithium ion secondary battery 50 has a rectangular flat shape, and a positive electrode tab 58 and a negative electrode tab 59 are taken out from both sides for extracting the electric power. A power generating element 57 is covered with a battery outer casing material 52 of the lithium ion secondary battery 50, and the periphery of the battery outer casing material 52 is fused by heat. The power generating element 57 is sealed in a state in which the positive electrode tab 58 and the negative electrode tab 59 are taken out to the outside. Here, the power generating element 57 corresponds to the power generating element 21 of the lithium ion secondary battery 10 illustrated in FIG. 1 described above. The power generating element 57 is one in which plural single battery layers (single cell) 19, which are each constituted by the positive electrode (positive electrode active material layer) 15, the electrolyte layer 17, and the negative electrode (negative electrode active material layer) 13, are stacked.

Incidentally, the lithium ion secondary battery is those having a flat shape of a stack type, and preferably, the power generating element is encased with an aluminum laminate film. Weight saving can be attained by such a form.

In addition, the taking out of the tabs 58 and 59 illustrated in FIG. 2 is not particularly limited as well. The positive electrode tab 58 and the negative electrode tab 59 may be taken out from the same side or each of the positive electrode tab 58 and negative electrode tab 59 may be divided into plural tabs and then taken out from each side, and it is not limited to the form illustrated in FIG. 2.

A general electric vehicle has a battery storage space of about 170 L. A cell and an auxiliary machine such as a device for controlling charge and discharge are stored in this space, and thus the storage space efficiency of a common cell is about 50%. The cell loading efficiency into this space is a factor to determine the cruising distance of an electric vehicle. The loading efficiency is impaired as the size of a single cell decreases, and thus it is impossible to secure the cruising distance.

Hence, in the present invention, the battery structure of which the power generating element is covered with an outer casing body preferably has a large size. Specifically, the length of the short side of a laminate cell battery is preferably 100 mm or more. Such a large-size battery can be used in a vehicle use. Here, the length of the short side of a laminate cell battery refers to the length of the shortest side. The upper limit of the length of the short side is not particularly limited, but it is usually 400 mm or less.

[Volume Energy Density and Rated Discharge Capacity]

According to the market requirement, a general electric vehicle needs to have a driving distance (cruising distance) of 100 km or more per single charge. Considering such a cruising distance, the volume energy density of a battery is preferably 157 Wh/L or more and the rated capacity is preferably 20 Wh or more.

Here, an increase in size of a battery is defined from the relation of the battery area or the battery capacity in the non-aqueous electrolyte secondary battery according to the present aspect as the viewpoint of a large-sized battery that is different from the viewpoint of the physical size of the electrode. Specifically, the non-aqueous electrolyte secondary battery according to the present aspect is preferably a flat and stack type laminate battery which has a ratio value of the battery area (projected area of the battery including the battery outer casing body) to the rated capacity of 5 $cm^2$/Ah or more and a rated capacity of 3 Ah or more. In this manner, when a battery having a large area and a large capacity is fabricated, a problem of thermal deterioration of lithium-nickel-manganese-cobalt composite oxide due to heat generation associated with the charge and discharge reactions as described above can be much more significantly manifested. On the other hand, in a battery which does not have a large area and a large capacity, such as a consumer battery of prior art, as described above, the problem of thermal deterioration of lithium-nickel-manganese-cobalt composite oxide due to heat generation associated with the charge and discharge reactions is not that significantly manifested, thus a problem of a decrease in capacity due to repeated charge and discharge is also relatively small.

Furthermore, the aspect ratio of a rectangular electrode is preferably from 1 to 3 and more preferably from 1 to 2. Incidentally, the aspect ratio of an electrode is defined by the length/width ratio of a positive electrode active material layer with a rectangular shape. As the aspect ratio is in this range, an advantage of having both the performance required for a vehicle and mounting space can be achieved.

[Conditions (1) to (4)]

In the non-aqueous electrolyte secondary battery of the present aspect, at least one of the following conditions (1) to (4) is satisfied.

Condition (1): a value obtained by dividing a direct current resistance [$\Omega$] of the battery by a heat resistance [(m·K)/W] in a plane direction of the battery is 0.055 or more. The upper limit value is preferably 0.15 or less from the viewpoint of practical working range.

Condition (2): a value obtained by dividing a direct current resistance [S$\Omega$] of the battery by a heat capacity [J/K] of the battery is $3.080 \times 10^{-6}$ or more. The upper limit value is preferably $6.2 \times 10^{-6}$ or less from the viewpoint of practical working range.

Condition (3): a value obtained by dividing a battery capacity [Ah] by a heat resistance [(m·K)/W] in a plane direction of the battery is 880 or more. The upper limit value is preferably 1200 or less from the viewpoint of practical working range.

Condition (4): a value obtained by dividing a battery capacity [Ah] by a heat capacity [J/K] of the battery is 0.05000 or more. The upper limit value is preferably 0.07 or less from the viewpoint of practical working range.

The present inventors have investigated the cause of a decrease in capacity due to repeated charge and discharge in the course of carrying out intense researches in order to provide a means capable of exerting sufficient cycle characteristics in a non-aqueous electrolyte secondary battery containing NMC composite oxide as a positive electrode active material. As a result, it has been found out that the amount of heat generated in the battery (power generating element) during charge and discharge increases in the case of using NMC composite oxide as the positive electrode active material. In addition, it has been demonstrated that NMC composite oxide has a large heat capacity, and it is difficult to release the heat generated during charge and discharge, and thus the temperature of NMC composite oxide locally increases and deterioration of the active material is likely to progress.

Moreover, the means for solving the above problem has been further investigated, and as a result, it has been found out that the above problem can be solved as a local temperature increase in the inside of the battery is suppressed when at least one of the above conditions (1) to (4) is satisfied, thereby completing the present invention.

As the "direct current resistance of the battery" in the present specification, a value obtained by the voltage change at the time of applying a predetermined current is employed. The "direct current resistance of the battery" is proportional to the amount of Joule heat generated in the battery, and it indicates that the amount of heat generated by Joule heat is greater as the direct current resistance is greater.

As the "battery capacity" in the present specification, a value calculated from the theoretical capacities of the positive electrode and the negative electrode in the working voltage range is employed. It indicates that the heat releasing properties decreases in a case in which the cell area or the cell thickness increases as well as the amount of heat generated increases when the "battery capacity" is greater.

As the "heat resistance in the plane direction of the battery" in the present specification, a value obtained by a heating test (time course of the battery temperature at the time of heating and heat release) in the plane direction of the battery is employed. The "heat resistance in the plane direction of the battery" is inversely proportional to the heat releasing properties in the plane direction of the battery, and it indicates that the heat releasing properties are higher as the heat resistance is smaller.

As the "heat capacity of the battery" in the present specification, a value calculated from the results obtained by heating the battery at a predetermined power and the specific heat of the battery member. The "heat capacity of the battery" is inversely proportional to the heat releasing properties of the battery, and it indicates that the heat releasing properties are higher as the heat capacity is smaller.

In other words, the "direct current resistance of the battery" and the "battery capacity" are both an indicator that represents the amount of heat generated in the battery, and the "heat resistance in the plane direction of the battery" and the "heat capacity of the battery" are both an indicator that represents the heat releasing properties of the battery. Hence, the values defined in the conditions (1) to (4) have significance as an indicator which represents the relation between the amount of heat generated and heat releasing properties in the battery. Consequently, the fact that the values defined in the conditions (1) to (4) are a particular numerical value or more means that sufficient heat releasing properties are exhibited with respect to the amount of heat generated in the battery.

The non-aqueous electrolyte secondary battery of the present aspect preferably has a stack type (flat type) shape as described above, but it is likely to release heat in the thickness direction and is less likely to release heat in the plane direction in the case of a stack type (flat type) battery. Hence, it is required that the heat resistance in the plane direction is sufficiently small with respect to the direct current resistance of the battery or the battery capacity as defined in the condition (1) or (3) in the case of perceiving the heat releasing properties of the battery as the heat resistance of the battery.

An object of the present invention is to provide a means capable of exerting sufficient cycle characteristics in a non-aqueous electrolyte secondary battery which contains lithium-nickel-manganese-cobalt composite oxide as a positive electrode active material as described above. The non-aqueous electrolyte secondary battery of the present aspect is intended to achieve the object by satisfying at least one of the conditions (1) to (4), and thus the respective non-aqueous electrolyte secondary batteries which satisfy any one of the conditions (1) to (4) have technical significances which are common or closely related with one another. Hence, it can be said that the respective non-aqueous electrolyte secondary batteries which satisfy any one of the conditions (1) to (4) are in a relation that has corresponding technical features.

In the present aspect, it is required to satisfy at least one of the conditions (1) to (4), but from the viewpoint of more effectively preventing a local temperature increase in the inside of the battery, it is preferable to satisfy two or more of the conditions (1) to (4) and the following conditions (5) and (6) (namely, one of the conditions (1) to (4) and at least one of the conditions (1) to (6) other than this), it is more preferable to satisfy three or more (namely, one of the conditions (1) to (4) and at least two of the conditions (1) to (6) other than this), it is even more preferable to satisfy four or more (namely, one of the conditions (1) to (4) and at least three of the conditions (1) to (6) other than this), it is even more preferable to satisfy five or more (namely, one of the conditions (1) to (4) and at least four of the conditions (1) to (6) other than this), and it is even more preferable to satisfy all of the six conditions.

Condition (5): a value obtained by dividing a direct resistance [SΩ] of the battery by a heat resistance [(m·K)/W] in a thickness direction of the battery is 0.0008 or more. The upper limit value is preferably 0.0015 or less from the viewpoint of practical working range.

Condition (6): a value obtained by dividing a battery capacity [Ah] by a heat resistance [(m·K)/W] in a thickness direction of the battery is 13 or more. The upper limit value is preferably 17 or less from the viewpoint of practical working range.

As the "heat resistance in the thickness direction of the battery" in the present specification, a value obtained by a heating test (time course of the battery temperature at the time of heating and heat release) in the thickness direction of the battery is employed. The "heat resistance in the thickness direction of the battery" is inversely proportional to the heat releasing properties in the thickness direction of the battery, and it indicates that the heat releasing properties are higher as the heat resistance is smaller.

It is preferable that particularly the non-aqueous electrolyte secondary battery of the present aspect satisfies at least one of the conditions (5) and (6) as well as it satisfies at least one of the conditions (1) to (4).

As described above, in a stack type (flat type) non-aqueous electrolyte secondary battery, it is possible to more effectively prevent a local temperature increase in the inside of the battery as the heat resistance in the thickness direction with respect to the direct current resistance of the battery or the battery capacity is sufficiently small. As a result, thermal deterioration of NMC composite oxide is suppressed, and it is possible to exert superior cycle characteristics in a non-aqueous electrolyte secondary battery.

The "direct current resistance of the battery [Ω]", the "battery capacity [Ah]", the "heat resistance in the plane direction of the battery [(m·K)/W]", the "heat resistance in the thickness direction of the battery [(m·K)/W]", and the "heat capacity of the battery [J/K]" in the conditions (1) to (6) can be appropriately set by those skilled in the art.

Among these, in the case of decreasing the "direct current resistance of the battery [Ω]", for example, it can be controlled by a method in which the conductivity of the respective constituent members such as an active material, a conductive aid, and an electrolytic solution contained in the battery is increased; the area in the plane direction of the battery is widened and the thickness thereof is thinned; or the like.

In the case of decreasing the "heat resistance in the plane direction of the battery [(m·K)/W]" and the "heat resistance in the thickness direction of the battery [(m·K)/W]", for example, it can be controlled by a method in which the heat capacity of the respective constituent members such as an active material, a conductive aid, an electrolytic solution, and a laminate material contained in the battery is decreased; the area in the plane direction or the cross-sectional area in thickness direction of the battery is widened and the thickness thereof is thinned, respectively; voids are provided in the structure of the electrode to facilitate escape of the Joule heat or the reaction heat; or the like.

In the case of decreasing the "heat capacity of the battery [J/K]", for example, it can be controlled by a method in which the specific heat of the respective constituent members such as an active material, a conductive aid, an electrolytic solution, and a laminate material contained in the battery is decreased; the mass of the respective constituent members is decreased; or the like.

In the present aspect, it is preferable to satisfy the conditions (1) and/or (2) in the entire range at a SOC (state of charge) of from 30 to 50%. In general, batteries have a high frequency in use at a SOC from 30 to 50%, and the direct current resistance of the battery [Ω] is a value that can vary by the SOC. Hence, it is possible to obtain much more effect of the present invention as the conditions (1) and/or (2) are satisfied in the entire above-mentioned range of the SOC.

[Assembled Battery]

An assembled battery is constituted by connecting plural batteries. In detail, the assembled battery is one which is constituted by connecting at least two or more batteries in series, in parallel, or in series and parallel. It is possible to freely control the capacity and voltage by connecting the batteries in series and in parallel.

It is also possible to form a detachable small-size assembled battery by connecting plural batteries in series or in parallel. Moreover, by further connecting plural detachable small-size assembled batteries in series or parallel, it is possible to form an assembled battery having a high capacity and a high output which is suitable as a power source or an auxiliary power source for driving a vehicle requiring a high volume energy density and a high volume output density. The number of the connected batteries for fabricating an assembled battery or the number of the stacked small-size assembled batteries for fabricating an assembled battery having a high capacity can be determined depending on the capacity or output of the battery that is mounted to a vehicle (electric vehicle).

[Vehicle]

The non-aqueous electrolyte secondary battery according to the present invention can maintain a discharge capacity even when being used for a long period of time and thus exhibits favorable cycle characteristics. Furthermore, it has a high volume energy density. For use in a vehicle such as an electric vehicle, a hybrid electric vehicle, a fuel cell electric vehicle, or a hybrid fuel cell electric vehicle, a long lifespan is required as well as a high capacity and a large size compared to use in an electric and mobile electronic device. Hence, the non-aqueous electrolyte secondary battery can be suitable utilized as a power source for a vehicle, for example, as a power source or as an auxiliary power source for driving a vehicle.

Specifically, the battery or the assembled battery formed by combining plural batteries can be mounted on a vehicle. According to the present invention, a battery exhibiting excellent long term reliability, output characteristics, and a long lifespan can be formed, and thus, by mounting such a battery, a plug-in hybrid electric vehicle having a long EV driving distance and an electric vehicle having a long driving distance per one charge can be constituted. This is because a vehicle having a long lifespan and high reliability can be provided as the battery or an assembled battery formed by combining plural batteries is used in, for example, a vehicle such as a hybrid car, a fuel cell electric car, or an electric car (including a two-wheel vehicle (motor bike) or a three-wheel vehicle in addition to all four-wheel vehicles (a passenger vehicle, a truck, a commercial vehicle such as a bus, a compact car, or the like)). However, the use is not limited to a vehicle, and it can be applied to various kinds of power sources of other vehicles, for example, a moving object such as an electric train, and it can be also utilized as a built-in power source of an uninterruptable power source unit.

The present invention will be described in more detail with reference to Examples and Comparative Examples, but the present invention is not limited to the following Examples in any way.

Example 1: (Fabrication of Battery)

A flat type battery having a structure in which the periphery of the battery outer casing material which was composed of a polymer-metal composite laminate film and had a thickness of 120 μm was fused by heat and the positive electrode terminal lead and negative electrode terminal lead having a thickness of 100 μm and a width of 80 mm were taken out from two places on one side among the heat-fused portions (FIG. 1).

Specifically, one that was obtained by coating and drying a slurry prepared by mixing a mixture of 70 parts by mass of $LiMn_2O_4$ and 23 parts by mass of NMC composite oxide ($LiNi_{0.80}Mn_{0.10}Co_{0.10}O_2$) as a positive electrode active material, 3 parts by mass of PVdF of a binder, and 4 parts by mass of acetylene black of a conductive aid on the positive electrode current collector of an aluminum foil having a thickness of 20 μm to form a positive electrode active material layer having a thickness of 80 μm on one side on both sides of the positive electrode current collector and cutting the resultant into 420 cm² (aspect ratio: 1.1) was used as the positive electrode. Incidentally, the mixing ratio of the binder to the conductive aid was set to 3:4 (mass ratio). One that was obtained by coating and drying a slurry prepared by mixing 95 parts by mass of amorphous carbon which were able to absorb and desorb lithium ions as a negative electrode active material and 5 parts by mass of PVdF of a binder on the negative electrode current collector of a copper foil having a thickness of 10 μm to form a negative electrode active material layer having a thickness of 60 μm on one side on both sides of the negative electrode current collector and cutting the resultant into 440 cm² was used as the negative electrode. A polypropylene separator having a thickness of 25 μm was used as the separator. In addition, one prepared by dissolving $LiPF_6$ in a solvent prepared by mixing PC-EC-DEC at a ratio of 5:25:70 (volume ratio) at 0.9 mol/L was used as the electrolytic solution.

18 sheets of the negative electrodes and 17 sheets of the positive electrodes were stacked by inserting the separator therebetween, a power generating element to which positive electrode and negative electrode terminal leads having a thickness of 100 μm and a width of 80 mm were connected was housed in the outer casing laminate film, the periphery of the battery outer casing material was fused by heat to seal the power generating element, thereby fabricating a flat type battery. Incidentally, the battery area (a projected area of the battery including the battery outer casing body) of the battery was 660 cm².

Comparative Example 1

The positive electrode was fabricated by setting the mixing ratio of the binder to the conductive aid of the positive electrode to 4:4 (mass ratio), and the battery was fabricated by the same method as in Example 1 except the positive electrode.

Comparative Example 2

The positive electrode was fabricated by setting the mixing ratio of the binder to the conductive aid of the positive electrode to 4:3 (mass ratio), and the battery was fabricated by the same method as in Example 1 except the positive electrode.

(Method for Measuring Capacity)

The upper limit voltage was set to 4.15 V, and the battery was charged at a current equivalent to 1 C by the current control, subsequently held for 2 hours at 4.15 V by the voltage control. Thereafter, the lower limit voltage was set to 2.5 V, and the battery was discharged at a current equivalent to 1 C by the current control, subsequently discharged at a current equivalent to 0.2 C.

The total discharge capacity when the charge and discharge control described above was conducted was adopted as the capacity (rated capacity) of the battery.

(Method for Measuring Direct Current Resistance)

After the discharge for the measurement of the battery capacity described above, the battery was charged by a capacity (SOC 50%) corresponding to 50% of the capacity at a current equivalent to 1 C by the current control. The voltage after the charge was denoted as V1. Subsequently, the battery was discharged for 20 seconds at a current equivalent to 1 C by the current control. The voltage after the discharge was denoted as V2.

From the measurement described above, the direct current resistance value was calculated by the following equation.

$$\text{Direct current resistance value} = \frac{V1 - V2}{\text{Current value equivalent to } 1C} \quad \text{[Mathematical expression 1]}$$

(Method for Measuring Heat Resistance Value in Thickness Direction)

(1) Measurement of Specific Heat

The battery was immersed in the heat transfer medium (Fluorinert) in the heat insulating container, and the heat transfer medium was heated at 20 W. The specific heat of the battery was calculated from the amount of power input and the temperature increase tendency of the battery and the heat transfer medium. The specific heat of the battery is expressed by the following equation.

$$C_{pB} = \frac{Q\tau + Q_s - m_f C_{pf}(\Delta T_f + \Delta T_{CF}) - W(\Delta T_f + \Delta T_{CF})}{m_B(\Delta T_B + \Delta T_{CB})} \quad \text{[Mathematical expression 2]}$$

$C_{pB}$ Specific heat of battery (J/kg·K)
$m_B$ Mass of battery (kg)
$\Delta T_B$ Surface temperature increase of battery (K)
Q Power input (W)
$Q_s$ Stirring heat input (W)
τ Heating time (sec)
$m_f$ Mass of heat transfer medium (kg)
$C_{pf}$ Specific heat of heat transfer medium (J/kg·K)
$\Delta T_f$ Temperature increase of heat transfer medium (K)
W Heat capacity of apparatus (J/K)
$\Delta T_{CB}$ Thermal runaway correction of battery (K)
$\Delta T_{CF}$ Thermal runaway correction of heat transfer medium (K)

(2) Measurement of Heat Resistance Value in Thickness Direction

With regard to the heat resistance value in the thickness direction, the battery was heated on a hot plate at 40° C., 55° C., and 70° C., the time course of the temperature was reproduced by the three-dimensional heat conduction equation, and the thermal conductivity was determined as a fitting parameter. The reciprocal of the thermal conductivity was calculated as the heat resistance value.

The three-dimensional heat conduction equation is expressed as follows.

$$\rho C_p \frac{\partial T}{\partial t} - \nabla \cdot (k \nabla T) = 0 \quad \text{[Mathematical expression 3]}$$

Here, ρ denotes the density, $C_p$ denotes the specific heat, k denotes the thermal conductivity which is anisotropic in the thickness direction and the plane direction, and T denotes the temperature. As the boundary condition at the surface other than the heating surface of the battery, the heat release condition expressed by the following equation is given.

$$(-n) \cdot (-k \nabla T) = h(T_{ext} - T) \quad \text{[Mathematical expression 4]}$$

Here, n denotes the plane normal vector, $T_{ext}$ denotes the atmosphere temperature at distant place, and h denotes the heat transfer coefficient. The thermal conductivity k and the heat transfer coefficient h are the fitting parameters of temperature distribution.

(Method for Measuring Heat Resistance Value in Plane Direction)

With regard to the heat resistance value in the plane direction, the end of the short side of the battery was inserted between two heaters, and heated at three levels of the heater temperature of 40° C., 55° C., and 70° C., and the temperature increase of the laminate cell was measured. In the same manner as in the measurement of heat resistance value in the thickness direction, the time course of temperature was reproduced by the three-dimensional heat conduction equation, the thermal conductivity was determined as a fitting parameter, and the heat resistance value was calculated.

(Method for Measuring Cycle Capacity Retention Rate)

The charge and discharge equivalent to 1 C of the battery was repeated 750 cycles at an atmosphere temperature of 45° C. by setting the upper limit voltage to 4.15 V and the lower limit voltage to 2.5 V.

The retention rate of discharge capacity at the 250th cycle, the 500th cycle, and the 750th cycle based on the discharge capacity at the first cycle was adopted as the cycle capacity retention rate.

The results are presented in Table 1.

TABLE 1

| | A Direct current resistance value Ω | B Capacity Ah | a Heat resistance in plane direction (m·K)/W | b Heat resistance in thickness direction (m·K)/W | c Heat capacity J/K | Condition (1) A/a | Condition (5) A/b | Condition (2) A/c | Condition (3) B/a | Condition (6) B/b | Condition (4) B/c | Cycle capacity retention rate % 250th cycle | 500th cycle | 750th cycle |
|---|---|---|---|---|---|---|---|---|---|---|---|---|---|---|
| Example 1 | 0.0020 | 32.5 | 0.027 | 1.92 | 648.8 | 0.072 | 0.00104 | $3.083 \times 10^{-6}$ | 1166 | 16.9 | 0.05009 | 95 | 90 | 85 |
| Comparative Example 1 | 0.0020 | 32.5 | 0.037 | 2.56 | 650.1 | 0.054 | 0.00078 | $3.076 \times 10^{-6}$ | 875 | 12.7 | 0.04999 | 92 | 87 | 83 |
| Comparative Example 2 | 0.0019 | 32.5 | 0.049 | 3.33 | 659.4 | 0.039 | 0.00057 | $2.881 \times 10^{-6}$ | 663 | 9.8 | 0.04929 | 92 | 83 | 76 |

From the results above, it has been indicated that the battery of Example 1 has superior cycle capacity retention rate to the batteries of Comparative Examples 1 and 2. It is considered that this is because the battery of Example 1 exhibits sufficient heat releasing properties with respect to the amount of heat generated, thus the local temperature increase in the inside of the battery can be prevented, and as a result, the thermal deterioration of lithium-nickel-manganese-cobalt composite oxide is suppressed.

REFERENCE SIGNS LIST

10 and 50 Lithium ion secondary battery
11 Negative electrode current collector
12 Positive electrode current collector
13 Negative electrode active material layer
15 Positive electrode active material layer
17 Separator
19 Single battery layer
21 and 57 Power generating element
25 Negative electrode current collecting plate
27 Positive electrode current collecting plate
29 and 52 Battery outer casing material
58 Positive electrode tab
59 Negative electrode tab

The invention claimed is:

1. A non-aqueous electrolyte secondary battery comprising:
   a power generating element formed by stacking a plurality of battery layers, each battery layer including a positive electrode obtained by forming a positive electrode active material layer containing lithium-nickel-manganese-cobalt composite oxide on a surface of a current collector, an electrolyte layer, and a negative electrode, wherein a length of a shortest side of the secondary battery is 100 mm or more, and at least one of the following conditions (1) to (4) is satisfied:
   (1) a value obtained by dividing a direct current resistance [Ω] of the battery by a heat resistance [(m·K)/W] in a plane direction of the battery is 0.055 or more;
   (2) a value obtained by dividing a direct current resistance [Ω] of the battery by a heat capacity [J/K] of the battery is $3.080 \times 10^{-6}$ or more;
   (3) a value obtained by dividing a battery capacity [Ah] by a heat resistance [(m·K)/W] in a plane direction of the battery is 880 or more; and
   (4) a value obtained by dividing a battery capacity [Ah] by a heat capacity [J/K] of the battery is 0.05000 or more.

2. The non-aqueous electrolyte secondary battery according to claim 1, wherein at least one of the conditions (1) and (2) is satisfied in the entire range at a SOC from 30 to 50%.

3. The non-aqueous electrolyte secondary battery according to claim 1, wherein at least another of the conditions (1) to (4 are satisfied.

4. The non-aqueous electrolyte secondary battery according to claim 1, wherein at least one of the conditions (5) and (6) are also satisfied:
   (5) a value obtained by dividing a direct resistance [□] of the battery by a heat resistance [(m □K)/W] in a thickness direction of the battery is 0.0008 or more; and
   (6) a value obtained by dividing a battery capacity [Ah] by a heat resistance f(m EK)/N] in a thickness direction of the battery is 13 or more.

5. The non-aqueous electrolyte secondary battery according to claim 1, wherein a value of a ratio of a battery area (projected area of the battery including a battery outer casing body) to a rated capacity is 5 cm²/Ah or more and the rated capacity is 3 Ah or more.

6. The non-aqueous electrolyte secondary battery according to claim 1, wherein an aspect ratio of the positive electrode defined as a length/width ratio of the rectangular shaped positive electrode active material layer is from 1 to 3.

7. The non-aqueous electrolyte secondary battery according to claim 1, wherein the negative electrode includes a negative active material comprising a carbon material or an element that is alloyed with lithium; the positive active material comprises a conductive aid comprising a carbon material; and the electrolyte layer comprises a liquid electrolyte comprising a solvent selected from carbonates and a lithium salt selected from $Li(CF_3SO_2)_2N$, $Li(C_2F_5SO_2)_2N$, $LiPF_6$, $LiBF_4$, $LiClO_4$ and $LiAsF_6$.

* * * * *